US009236067B2

(12) United States Patent
Ferrario et al.

(10) Patent No.: US 9,236,067 B2
(45) Date of Patent: Jan. 12, 2016

(54) METHOD AND APPARATUS FOR SPEED CONTROL OF VOICE COIL MOTOR RETRACT OPERATION DEPENDENT UPON AVAILABLE POWER

(71) Applicant: STMicroelectronics Asia Pacific Pte. Ltd., Singapore (SG)

(72) Inventors: Lorenzo Ferrario, Singapore (SG); Kaufik Linggajaya, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 187 days.

(21) Appl. No.: 13/956,484

(22) Filed: Aug. 1, 2013

(65) Prior Publication Data
US 2015/0036238 A1   Feb. 5, 2015

(51) Int. Cl.
H02P 6/18 (2006.01)
G11B 5/02 (2006.01)

(52) U.S. Cl.
CPC ..................................... G11B 5/022 (2013.01)

(58) Field of Classification Search
CPC ...... G11B 33/121; G11B 5/11; G11B 5/4886; G11B 5/54; G11B 5/59622; G11B 5/59627; G11B 5/59644; G11B 5/5965; H02K 41/0354; H02K 41/0356; H02P 6/182; H02P 6/06; H02P 6/145; Y10S 360/903
USPC .......... 318/400.14, 400.34, 400.35, 560, 561; 369/13.22; 360/97.21
See application file for complete search history.

(56) References Cited

U.S. PATENT DOCUMENTS

| | | | | |
|---|---|---|---|---|
| 3,745,373 A * | 7/1973 | Jones et al. | | 327/132 |
| 4,162,437 A * | 7/1979 | Keith et al. | | 388/854 |
| 4,546,293 A * | 10/1985 | Peterson et al. | | 318/400.14 |
| 5,099,183 A * | 3/1992 | Webe | | 318/268 |
| 5,586,306 A * | 12/1996 | Romano et al. | | 711/112 |
| 5,694,267 A * | 12/1997 | Morehouse et al. | | 360/97.21 |
| 6,236,625 B1 * | 5/2001 | Schell et al. | | 369/13.22 |
| 6,278,665 B1 * | 8/2001 | Schell et al. | | 369/13.22 |
| 6,317,391 B1 * | 11/2001 | Schell et al. | | 369/13.17 |
| 6,392,375 B1 | 5/2002 | Portaluri et al. | | |
| 6,434,087 B1 * | 8/2002 | Schell et al. | | 369/13.02 |
| 7,061,707 B2 | 6/2006 | Fong et al. | | |
| 7,106,022 B2 | 9/2006 | Brenden et al. | | |
| 7,161,757 B1 | 1/2007 | Krishnamoorthy et al. | | |
| 7,193,804 B1 * | 3/2007 | Kheymehdooz | | 318/400.34 |
| 7,230,785 B2 * | 6/2007 | Itagaki et al. | | 360/73.03 |
| 7,280,308 B2 | 10/2007 | Kokami | | |
| 7,332,886 B2 | 2/2008 | Maiocchi et al. | | |
| 7,705,548 B2 | 4/2010 | Galbiati | | |
| 7,746,254 B2 * | 6/2010 | Makihara et al. | | 341/122 |
| 8,248,012 B2 | 8/2012 | Betta et al. | | |

(Continued)

Primary Examiner — Paul Ip
(74) Attorney, Agent, or Firm — Gardere Wynne Sewell LLP (57) ABSTRACT

The back EMF ($B_{EMF}$) of a motor is sensed and compared to a target back EMF ($B_{EMF}$) to generate an error control signal. The circuit supply voltage is also sensed. A PWM motor control signal is generated in response to a comparison of the error control signal to a ramp signal having a variable slope. The variable slope is selected in response to the sensed circuit supply voltage. The motor is then driven in response to the PWM control signal. The sign of the error control signal is used to selectively short one of motor terminals to a reference voltage supply node while the other motor terminal is driven in response to the PWM control signal.

22 Claims, 6 Drawing Sheets

(56) References Cited

U.S. PATENT DOCUMENTS

| | | | |
|---|---|---|---|
| 8,796,973 B2* | 8/2014 | Bauer et al. | 318/400.35 |
| 2005/0068656 A1 | 3/2005 | Salina et al. | |
| 2005/0264820 A1* | 12/2005 | Podoleanu et al. | 356/479 |
| 2005/0264920 A1* | 12/2005 | Ziemer et al. | 360/78.04 |
| 2006/0044664 A1* | 3/2006 | Itagaki et al. | 360/73.03 |
| 2009/0167582 A1* | 7/2009 | Makihara et al. | 341/144 |
| 2010/0165811 A1 | 7/2010 | Bonvin | |
| 2013/0249459 A1* | 9/2013 | Bauer et al. | 318/400.35 |

* cited by examiner

METHOD AND APPARATUS FOR SPEED CONTROL OF VOICE COIL MOTOR RETRACT OPERATION DEPENDENT UPON AVAILABLE POWER

TECHNICAL FIELD

The present invention relates to hard disk drives and, more particularly, to controlling the movement of the read/write head in a hard disk drive.

BACKGROUND

A hard disk drive (HDD) includes a disk on which data is stored, a spindle motor which rotates the disk, a read/write head, and a voice coil motor (VCM) to move the read/write head over the disk for reading/writing data from/to the disk surface. When the disk is rotating, and read/write operations are in progress, the head, which is carried on a VCM arm, is moved from a parked position to a position above the data storage surface of the disk. This is referred to in the art as "ramp loading" or "un-parking" of the VCM arm. When the disk is not rotating, the head must be parked in a safety zone away from the disk in order to prevent any damage to the disk or head. This is referred to in the art as "ramp unloading" or "parking" the VCM arm. When a power loss (any power supply inactivation such as a power failure event or a power-down event) occurs, it is important to move the read/write head to the safety zone away from the disk. If the VCM arm is not fully parked in the safety zone, the read/write head may land on the disk while the disk is spinning or stopped potentially resulting in damage to the disk and/or the head. It is thus critical to ensure full retraction of the VCM arm.

Those skilled in the art understand, however, that it is also important to precisely control the speed of the VCM when moving the VCM arm. For example, during retraction of the VCM arm a precise control over VCM speed is needed to ensure that the VCM arm carrying the read/write is not damaged if an obstacle is encountered. Conversely, during loading of the VCM arm and tracking of data on the disk, it is important to control VCM speed in order to ensure accuracy of read/write head placement over time.

The operation to park the VCM arm can present a challenge when a power loss (any power supply inactivation such as a power failure event or a power-down event) occurs. It is known in the art to harvest energy from the spindle motor in response to a power loss to power the operation of the VCM in retract mode. In such a case, the spindle motor is exploited as a generator whose output voltage is dependent on the speed of spindle motor rotation and the electrical constant of the motor itself. As the spindle motor slows, however, the amount of generated power begins to decrease. The generated power can be supplemented by energy stored in a capacitor during normal operation, but eventually the power available for use in VCM arm retraction will dissipate to zero, and the unloading of the VCM arm must be completed before that point is reached.

Because it is critical to complete the parking of the VCM arm while power remains available, this would suggest controlling the VCM for a very fast movement of the VCM arm to the parking zone. However, as discussed above, precise control over the speed of the VCM during VCM arm movement must be exercised so as to ensure that the retraction does not damage the head and/or arm. This would suggest controlling a slower movement of the VCM arm towards the parking zone. If the movement is too slow, however, the power available for retraction may fully dissipate before parking is completed, thus leaving the read/write head in a dangerous position over the disk.

There is accordingly a need in the art for a method and apparatus to control the speed of VCM operation during emergency retraction of the VCM arm so that the VCM arm retraction achieves parking on the ramp without moving too quickly. There is further a need in the art for adjusting the emergency retraction operation in response to the dwindling power availability.

SUMMARY

In an embodiment, a circuit for driving a motor having a positive terminal and negative terminal comprises: a drive circuit configured to be coupled to the positive and negative terminals of the motor and operable to drive motor operation; a back EMF ($B_{EMF}$) sensing circuit configured to be coupled to the positive and negative terminals of the motor and operable to sense motor $B_{EMF}$; an error circuit operable to compare the sensed motor $B_{EMF}$ to a target $B_{EMF}$ and generate an error control signal in response to said comparison; a power supply sensing circuit configured to sense a supply voltage of the drive circuit; and a pulse width modulation (PWM) circuit configured to generate a PWM control signal in response to a comparison of the error control signal to a ramp signal having a variable slope, wherein the variable slope is selected in response to the sensed supply voltage; wherein operation of said drive circuit is controlled in response to said PWM control signal.

In an embodiment, a method for driving a motor comprises: sensing a back EMF ($B_{EMF}$) of the motor; comparing the sensed motor $B_{EMF}$ to a target $B_{EMF}$; generating an error control signal in response to said comparison; sensing a circuit supply voltage; generating a PWM motor control signal in response to a comparison of the error control signal to a ramp signal having a variable slope, wherein the variable slope is selected in response to the sensed circuit supply voltage; and controlling operation of the motor in response to said PWM control signal.

In an embodiment, an apparatus comprises: a motor having a positive terminal and negative terminal; a drive circuit coupled to the positive and negative terminals of the motor; and a control circuit coupled to the motor and the drive circuit and operable to: sense a back EMF ($B_{EMF}$) of the motor; compare the sensed motor $B_{EMF}$ to a target $B_{EMF}$ and generate an error signal; sense a supply voltage of the drive circuit; generate a PWM control signal by comparing the error control signal to a ramp signal having a variable slope selected in response to the sensed supply voltage; and control operation of the drive circuit in response to said PWM control signal.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 1:
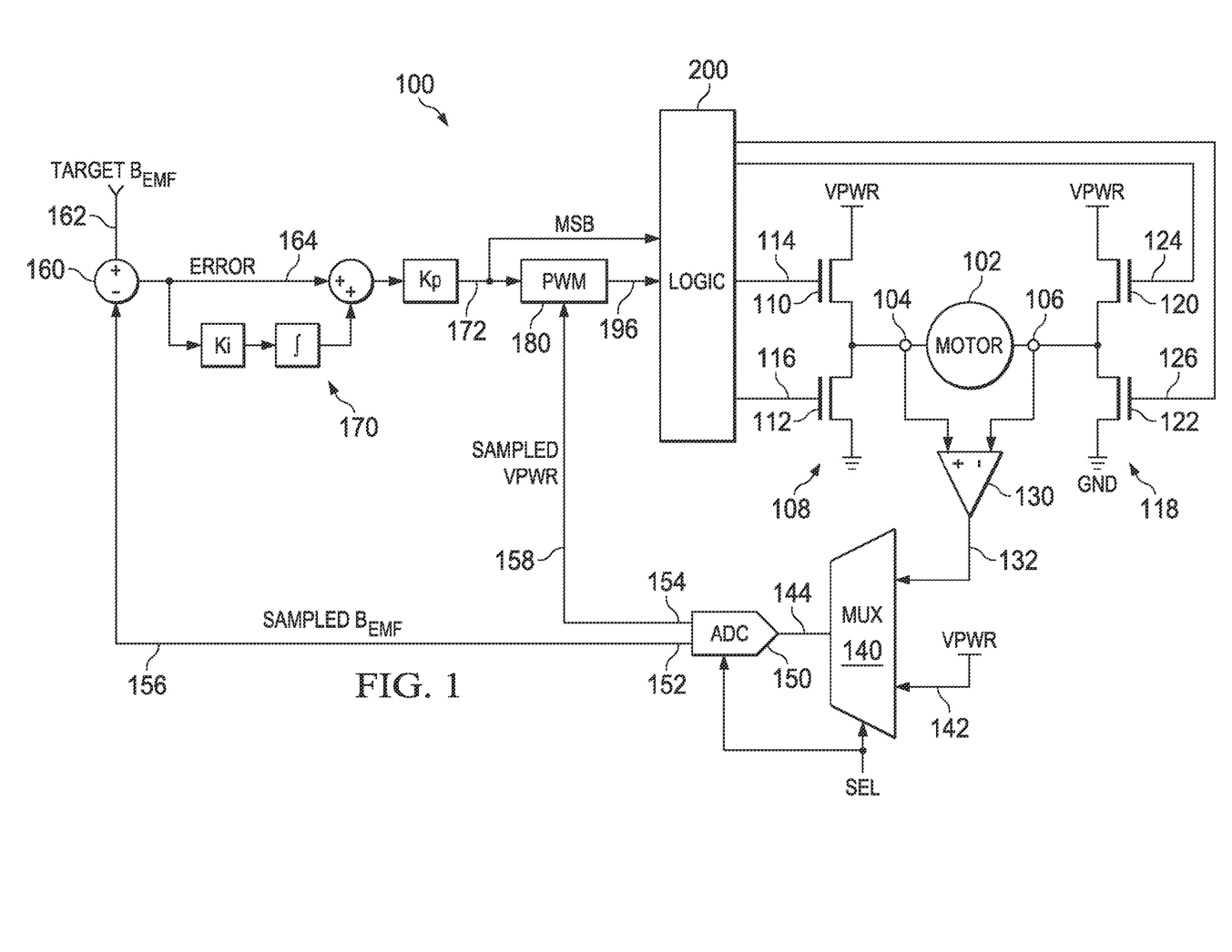
FIG. 1 is a block diagram of a control circuit for driving a motor.

Reference is now made to FIG. 1 which illustrates a block diagram of a control circuit 100 for driving a motor 102 (said motor may, for example, comprise a voice coil motor (VCM) of a hard disk drive (HDD) system). The motor 102 includes a positive supply terminal 104 and a negative supply terminal 106.

A first driver circuit 108 has an output terminal coupled to the positive supply terminal 104 of the motor 102. The first driver circuit 108 comprises a high side drive transistor 110 and a low side drive transistor 112 connected in series at the driver output terminal (motor positive supply terminal 104). In a preferred implementation, the high side drive transistor 110 and low side drive transistor 112 are both n-channel power MOSFETs. It will be understood, however, that the high side drive transistor 110 may comprise a p-channel power MOSFET and the low side drive transistor 112 may comprise an n-channel power MOSFET. A gate terminal of the high side drive transistor 110 receives a first control signal 114, and a gate terminal of the low side drive transistor 112 receives a second control signal 116. The drain terminal of the high side drive transistor 110 is coupled to a first power supply node (VPWR), with its source coupled to the motor positive supply terminal 104, and the source terminal of the low side drive transistor 112 is coupled to a second power supply node (GND), with its drain coupled to the motor positive supply terminal 104.

A second driver circuit 118 has an output terminal coupled to the negative supply terminal 106 of the motor 102. The third driver circuit 118 comprises a high side drive transistor 120 and a low side drive transistor 122 connected in series at the driver output terminal (motor negative supply terminal 106). In a preferred implementation, the high side drive transistor 120 and low side drive transistor 122 are both n-channel power MOSFETs. It will be understood, however, that the high side drive transistor 120 may comprise a p-channel power MOSFET and the low side drive transistor 122 may comprise an n-channel power MOSFET. A gate terminal of the high side drive transistor 120 receives a third control signal 124, and a gate terminal of the low side drive transistor 122 receives a fourth control signal 126. The drain terminal of the high side drive transistor 120 is coupled to the first power supply node (VPWR), with its source coupled to the motor positive supply terminal 104, and the source terminal of the low side drive transistor 122 is coupled to the second power supply node (GND), with its drain coupled to the motor positive supply terminal 104.

The first and second driver circuits 108 and 118 accordingly form an H-bridge type driver as known to those skilled in the art.

Although MOSFET devices are shown in the illustrated embodiment, it will be understood that the driver circuits could alternatively utilize bipolar transistors or other suitable transistors.

The back electromotive force ($B_{EMF}$) produced by a spinning motor is proportional to the speed of motor rotation in a manner well known to those skilled in the art. Thus, the speed of the motor 102 can be measured by measuring its back electromotive force ($B_{EMF}$). The making of such a measurement must be performed when the driver circuits 108 and 118 are not applying voltages to the motor terminals 104 and 106.

The first driver circuit 108 and second driver circuit 118 are accordingly controlled to drive the motor 102 in a discontinuous operation mode. Thus, the motor drive operation alternates between a first state (also referred to as a driving phase of operation) wherein the first driver circuit 108 and second driver circuit 118 are driven in a conduction mode (i.e., some drive transistors are turned on and current flows through the motor 102) and second state (also referred to as a sensing phase of operation) wherein the first driver circuit 108 and second driver circuit 118 are driven in a high impedance mode (i.e., all drive transistors are turned off and no current flows through the motor 102). With the motor driver circuits in the high impedance state, and no current flowing within the motor 102, the $B_{EMF}$ produced by the spinning motor can be measured as the voltage drop across the motor from the positive supply terminal 104 to the negative supply terminal 106.

The control circuit 100 further includes a differential amplifier 130 having a first (positive) input terminal coupled to the positive supply terminal 104 of the motor 102 and a second (negative) input terminal coupled to the negative supply terminal 106 of the motor 102. The amplifier 130 further includes an output terminal generating an analog voltage (sensed $B_{EMF}$) signal 132 having a voltage value which is substantially equal to the voltage difference between the positive supply terminal 104 and the negative supply terminal 106 of the motor 102. In other words, the output analog voltage signal 132 is a measure of the $B_{EMF}$ produced by the spinning motor 102, and thus is directly proportional to the speed of motor rotation.

The control circuit 100 further includes an analog multiplexer (MUX) circuit 140 having a first input terminal coupled to receive the analog voltage signal 132 from the amplifier 130 and a second input terminal coupled to the first power supply node to receive a positive supply voltage (VPWR) signal 142 equal to the power supply voltage VPWR applied to the first and second driver circuits 108 and 118. The analog multiplexer circuit 140 further includes an output terminal 144 passing a selected one of the analog voltage signal 132 or the positive supply voltage (VPWR) signal 142. The selection is made by a selection signal (SEL) applied to a select input of the analog multiplexer circuit 140. When the selection signal (SEL) has a first state, the analog voltage (sensed $B_{EMF}$) signal 132 is selected for output 144 from the analog multiplexer circuit 140, and when the selection signal (SEL) has a second state, the positive supply voltage (VPWR) signal 142 is selected for the output 144 from the analog multiplexer circuit 140.

The control circuit 100 still further includes an analog-to-digital converter (ADC) circuit 150. The analog-to-digital converter circuit 150 includes an input terminal coupled to the output 144 from the analog multiplexer circuit 140 and also includes first and second digital outputs 152 and 154. The digital outputs 152 and 154 may each comprise a multi-bit parallel data output or a single-bit serial data output depending on the configuration of the converter and subsequent digital processing circuitry (to be described below). The analog-to-digital converter circuit 150 functions to sample and convert the analog signal present at the input terminal to a digital data value. If the analog signal present at the input terminal is the analog voltage (sensed $B_{EMF}$) signal 132, as indicated by the select SEL signal, a sampling and digital conversion of that signal is made with the corresponding $B_{EMF}$ digital data output (Sampled $B_{EMF}$) signal 156 presented at the first digital output 152. Conversely, if the analog signal present at the input terminal is the positive supply voltage (VPWR) signal 142, as indicated by the select SEL signal, a sampling and digital conversion of that signal is made with the corresponding VPWR digital data output (Sampled VPWR) signal 158 presented at the second digital output 154.

The selection circuit may operate in coordination with the discontinuous operation of the driver circuit. When the driver circuit is tristated to support measurement of the motor 102 $B_{EMF}$, the select SEL signal is set to control the MUX circuit 140 and the analog-to-digital converter circuit 150 to produce the $B_{EMF}$ digital data output signal 156. However, when the driver circuit is configured to drive the operation of the motor 102, the select SEL signal is set to control the MUX circuit 140 and the analog-to-digital converter circuit 150 to produce the VPWR digital data output signal 158.

It will be understood that an alternate implementation of the circuit 100 could eliminate the MUX circuit and provide two analog-to-digital converter circuits 150, one such circuit for processing each of the analog voltage (sensed $B_{EMF}$) signal 132 and positive supply voltage (VPWR) signal 142.

The control circuit 100 still further includes a digital summation circuit 160 having a first (positive) input terminal coupled to receive a target $B_{EMF}$ digital data signal 162 and a second (negative) input terminal coupled to receive the $B_{EMF}$ digital data output signal 156 (representing the digitally converted analog voltage (sensed $B_{EMF}$) signal 132). The summation circuit 160 further includes an output terminal generating an error data signal 164 equal to the difference between the target $B_{EMF}$ data signal 162 and the $B_{EMF}$ digital data output signal 156. Here, the target $B_{EMF}$ digital data signal 162 represents the target operating speed of the spinning motor 102 and the $B_{EMF}$ digital data output signal 156 represents the measured operating speed of the spinning motor 102. The error data signal 164 thus represents the difference between those speeds, and the goal of circuit 100 operation is to drive that difference to zero.

A proportional-integral controller circuit 170 has an input configured to receive the error data signal 164 and an output configured to generate a motor control data signal 172. The proportional-integral controller circuit 170 performs an operation in the digital domain which synthesizes a transfer function of the following form:

$$OUT = Kp \times (IN + (Ki \times \int IN))$$

where: IN is the error data signal 164, OUT is the motor control data signal 172, Kp and Ki are fixed multipliers, and $\int$ is integration over time.

The operation of the proportional-integral controller circuit 170 is performed once for every operating cycle of the circuit 100 operation. Each operating cycle comprises one driving phase of operation followed by one sensing phase of operation.

The motor control data signal 172 is a multi-bit digital data signal which represents a speed control to be exercised over the driving of the motor 102 so as to reduce and/or eliminate the measured error calculated by the summation circuit 160 (i.e., to equalize the target $B_{EMF}$ data signal 162 and the $B_{EMF}$ digital data output signal 156). The goal is to drive this error towards zero and thus regulate the speed of the motor 102 in accordance with a desired speed represented by the target $B_{EMF}$ data signal 162.

The control circuit 100 still further includes a PWM control circuit 180 coupled to receive motor control data signal 172 and the VPWR digital data output signal 158. The PWM control circuit is configured to generate a PWM control signal 196.

Figure 2:
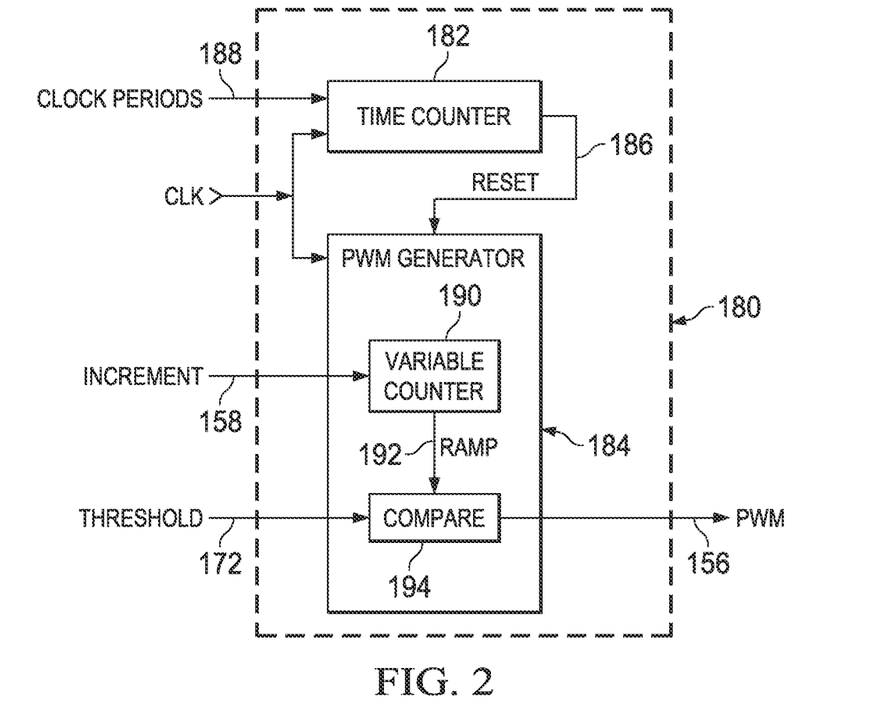
FIG. 2 is a block diagram of the PWM control circuit.

Reference is now made to FIG. 2 which illustrates a block diagram of the PWM control circuit 180. The PWM control circuit 180 includes a time counter circuit 182 and a PWM signal generator circuit 184. The time counter circuit 182 and PWM signal generator circuit 184 are both clocked by a clock signal CLK generated by any suitable clock generator (not shown) known to those skilled in the art.

Figure 3A:
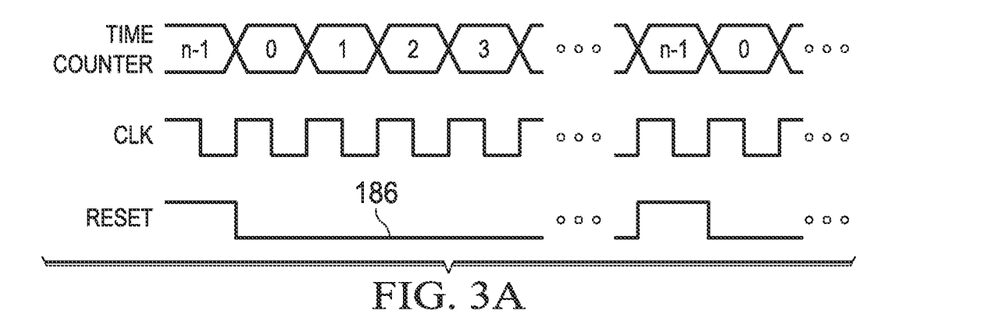
FIGS. 3A-3J are diagrams illustrating PWM circuit operation.

The time counter circuit 182 generates a reset output signal 186. The time counter circuit 182 receives a control input 188 which indicates a number of clock periods that are to be counted between assertions of the reset output signal 186. The time counter circuit 182 functions to count the clock periods in the clock signal CLK and assert the reset output signal 186 once every n clock periods (where n is specified by the control input 188). This operation is illustrated in FIG. 3A. The n clock periods specified by a control input 188 sets the PWM operating frequency, and adjustment of the value of n will correspondingly adjust the PWM operating frequency.

Referring once again to FIG. 2, the PWM generator circuit 184 receives the reset output signal 186, the motor control data signal 172 output from the proportional-integral controller circuit 170 and the VPWR digital data output signal 158 output from the second digital output 154 of the analog multiplexer circuit 140.

The PWM generator circuit 184 includes a variable counter circuit 190 that is clocked by the clock signal CLK and reset by the reset output signal 186. The variable counter circuit 190 is configured to increment with each clock period in the clock signal CLK by an increment amount i (where i has a value derived from the VPWR digital data output signal 158). The variable counter circuit 190 accordingly functions to generate a digital ramp signal 192 having a variable slope, wherein the value of the slope is controlled by the VPWR digital data output signal 158. The upcounting performed by the variable counter circuit 190 is reset with each assertion of the reset output signal 186.

Figure 3B:
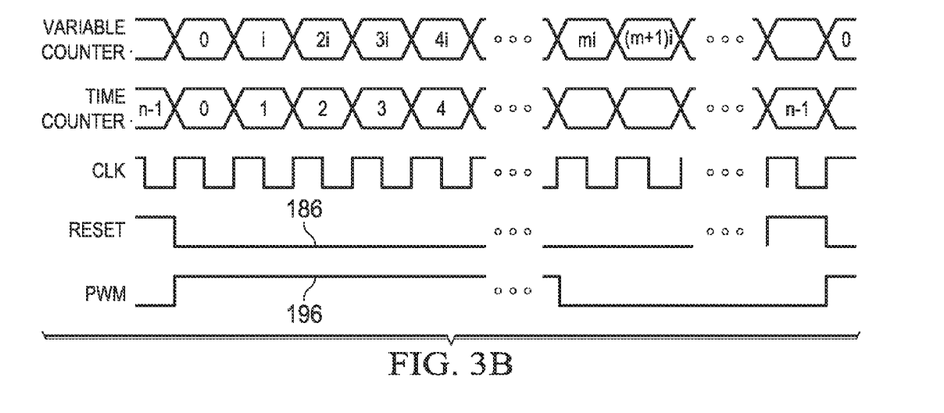

This operation is illustrated in FIG. 3B which illustrates an example where the value of i is fixed over the PWM cycle set by reset output signal 186. It will be noted, however, that the value of the increment amount i is not necessarily fixed during the time of the cycle set by the reset output signal 186 (in other words, the ramp need not be linear). The reason for this is because value of the select SEL signal can be set to continue to select (through MUX circuit 140) and sample/convert (through the analog-to-digital converter circuit 150) the positive supply voltage (VPWR) signal 142. If there is a change in the positive supply voltage VPWR value during the PWM cycle, the value of the increment amount i will correspondingly change and this will result in an adjustment being made to the variable slope of the digital ramp signal 192 within the time of the cycle set by the reset output signal 186.

In an alternate embodiment, the select SEL signal is controlled to cause the positive supply voltage VPWR value be selected, sensed, sampled and converted only once per cycle set by the reset output signal 186, and thus the slope of the digital ramp signal 192 is fixed during cycle, but is variably adjusted with each new PWM cycle.

In yet another embodiment, the slope of the digital ramp signal 192 is adjusted corresponding to the discontinuous operation of the driver circuit such that the value is updated corresponding to changes between the driving and sensing phases of operation, and thus may be fixed over a plurality of PWM cycles.

Figure 3C:
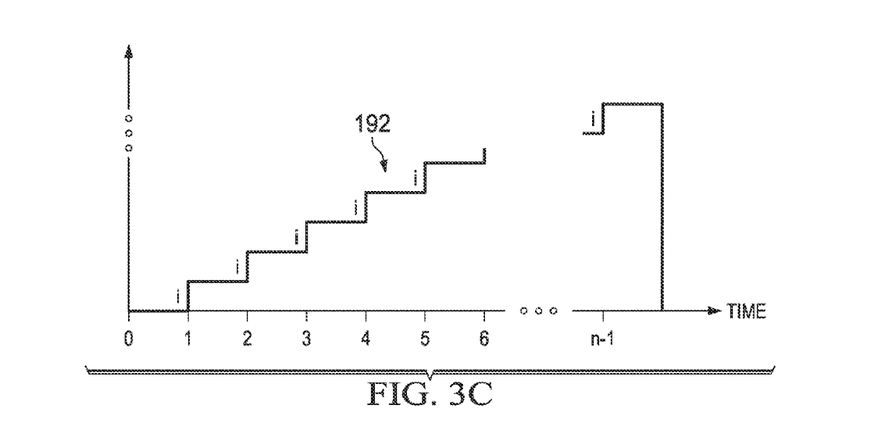
Figure 3D:
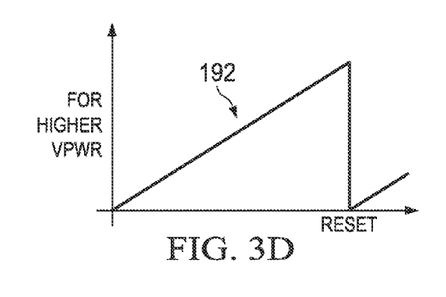
Figure 3E:
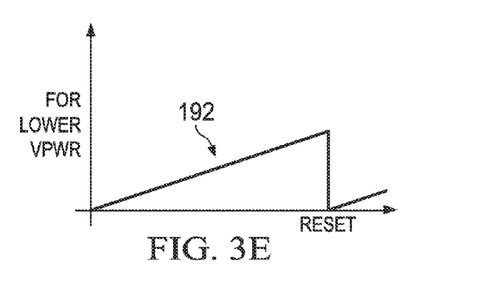

FIG. 3C illustrates in analog format an example of the digital ramp signal 192 present at the output of the variable counter circuit 190. With each clock CLK period, the digital value of the digital ramp signal 192 increments by i (it being understood that the value of i is not necessarily fixed during the PWM cycle set by the reset signal 186, but rather may dynamically change in response to changes in the sensed positive supply voltage VPWR value). For each increment of the clock CLK n, the digital value of the variable counter 190 increases over the previous value by the current digital value of i. When the clock CLK reaches n, the time counter 182 asserts the reset signal 186 and the digital value of the digital ramp signal 192 resets to zero. The value of i sets the slope of the digital ramp signal 192, and the value of i is dependent on the VPWR digital data output signal 158. More specifically, in a preferred embodiment, the instantaneous slope value i is linearly proportional to the VPWR digital data output signal 158. Thus, relatively higher values of the VPWR digital data output signal 158 (which indicate relatively higher values of the VPWR voltage) will produce a digital ramp signal 192 with a relatively higher slope. Conversely, relatively lower values of the VPWR digital data output signal 158 (which indicate relatively lower values of the VPWR voltage) will produce a digital ramp signal 192 with a relatively lower slope. This relationship is illustrated in FIGS. 3D and 3E (which specifically illustrate, without limitation, the case of a constant sampled value of the VPWR voltage and fixed value of i within the same PWM cycle).

Figure 3F:
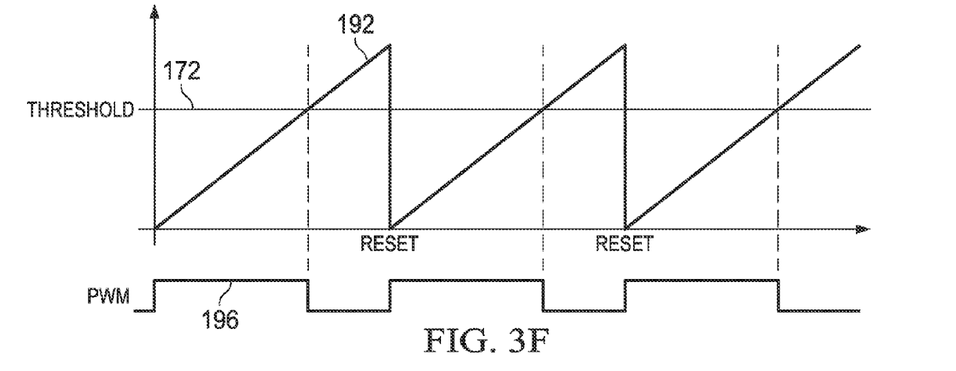
Figure 3G:
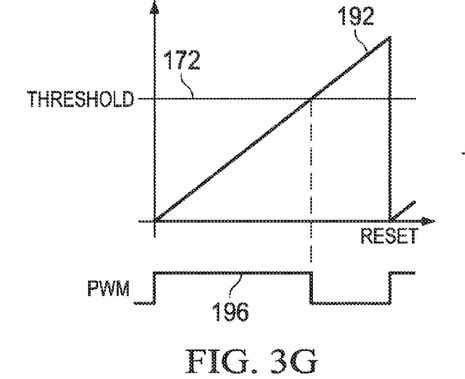
Figure 3H:
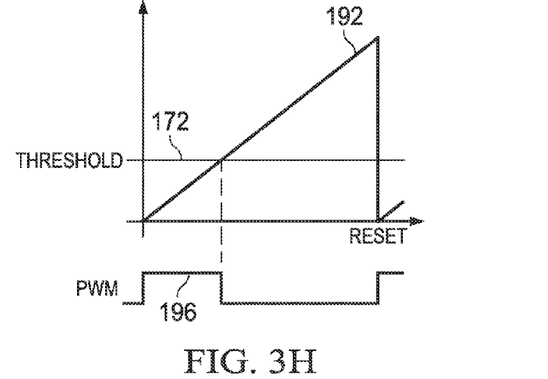
Figure 3I:
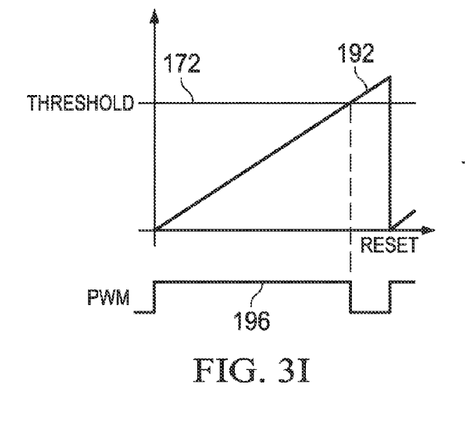
Figure 3J:
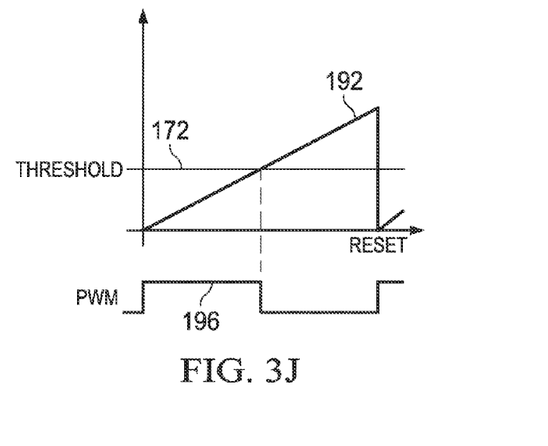

With reference once again to FIG. 2, the PWM generator circuit 184 further includes a comparator circuit 194 configured to compare the digital ramp signal 192 to a threshold value set in response to the motor control data signal 172. The comparator circuit 194 has an output generating the PWM control signal 196. The PWM control signal 196 has a first logic state (for example, logic high) when the digital ramp signal 192 is less than the threshold set by the motor control data signal 172, and has a second logic state (for example, logic low) when the digital ramp signal 192 is equal to or greater than the threshold set by the motor control data signal 172. This operation is illustrated in FIG. 3B (with an exemplary threshold of m×i and a fixed value of i during the PWM cycle) and FIG. 3F (which specifically illustrates, without limitation, the case of a constant sampled value of the VPWR voltage and fixed value of i within the same PWM cycle).

Because the slope of the digital ramp signal 192 is variable (dependent on the VPWR digital data output signal 158) and the value of the motor control data signal 172 is also variable (dependent on the error difference between the target $B_{EMF}$ and the measured $B_{EMF}$), the point in time within each PWM cycle where the PWM signal 196 changes state is dependent on both the VPWR digital data output signal 158 (designating the slope of the ramp) and the motor control data signal 172 (designating the threshold for comparison to the ramp). This is illustrated in FIGS. 3G-3J (which specifically illustrate, without limitation, the case of a constant sampled value of the VPWR voltage and fixed value of i within the same PWM cycle).

It will accordingly be noted, for a same threshold value, that reduction in the slope of the ramp due to a decrease in the sampled VPWR signal will result in a longer PWM on time. So, in the case of an emergency retract operation, where the VPWR voltage is dropping, the circuit 100 will react to the falling VPWR voltage by increasing the duty cycle of the PWM signal so as to maintain motor rotation and move the VCM arm towards the parked position.

Reference is once again made to FIG. 2. As discussed above, the motor control data signal 172 is a multi-bit digital data signal. The most significant bit (MSB) of the multi-bit motor control data signal 172 is a sign bit (not considered in setting the threshold) and the remaining bits are the magnitude of the signal (which are considered in setting the threshold). Thus, the threshold value for comparison to the ramp signal is provided by the magnitude bits of the multi-bit motor control data signal 172. The sign bit of the multi-bit motor control data signal 172 is used as an enable bit to selectively enable operation of the drive transistors within the first and second driver circuits 108 and 118 and control the direction of current flow within the motor 102 (and thus control the direction of motor rotation).

The control circuit 100 still further includes a logic circuit 200 configured to generate the first control signal 114, second control signal 116, third control signal 124 and fourth control signal 124. The control signals are generated by the logic circuit 200 in response to the PWM signal 196 and the most significant bit (MSB) of the multi-bit motor control data signal 172.

Figure 4:
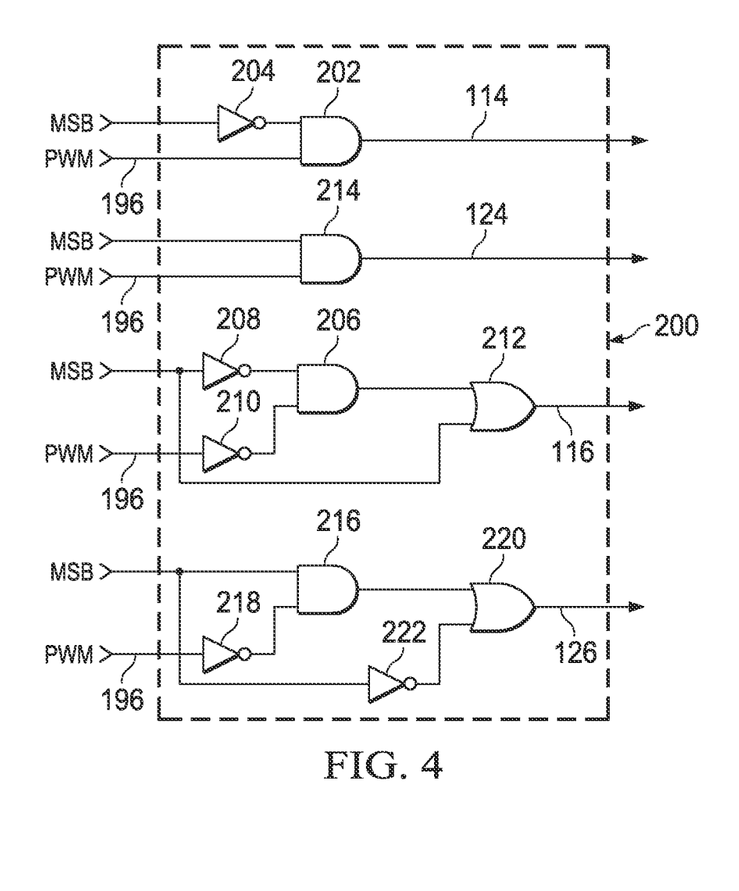
FIG. 4 is a circuit diagram of a logic circuit.

Reference is now made to FIG. 4 which illustrates a circuit diagram of the logic circuit 200.

The first control signal 114 is applied to the gate of the high side drive transistor 110 in the first driver circuit 108 (see, FIG. 2). The logic circuit 200 includes a logic AND gate 202 having a first input receiving an inverted 204 most significant bit (MSB) of the multi-bit motor control data signal 172 and a second input receiving the PWM control signal 196. The output of the logic AND gate 202 generates to the first control signal 114.

The second control signal 116 is applied to the gate of the low side drive transistor 112 in the first driver circuit 108 (see, FIG. 2). The logic circuit 200 includes a logic AND gate 206 having a first input receiving an inverted 208 most significant bit (MSB) of the multi-bit motor control data signal 172 and a second input receiving an inverted 210 PWM control signal 196. The logic circuit 200 further includes a logic OR gate 212 having a first input receiving an output of the AND gate 206 and a second input receiving the most significant bit (MSB) of the multi-bit motor control data signal 172. The output of the logic OR gate 212 generates to the second control signal 116.

The third control signal 124 is applied to the gate of the high side drive transistor 120 in the second driver circuit 118 (see, FIG. 2). The logic circuit 200 includes a logic AND gate 214 having a first input receiving the most significant bit (MSB) of the multi-bit motor control data signal 172 and a second input receiving the PWM control signal 196. The output of the logic AND gate 214 generates to the third control signal 124.

The fourth control signal 126 is applied to the gate of the low side drive transistor 122 in the second driver circuit 118 (see, FIG. 2). The logic circuit 200 includes a logic AND gate 216 having a first input receiving the most significant bit (MSB) of the multi-bit motor control data signal 172 and a second input receiving an inverted 218 PWM control signal 196. The logic circuit 200 further includes a logic OR gate 220 having a first input receiving an output of the AND gate 216 and a second input receiving an inverted 222 most significant bit (MSB) of the multi-bit motor control data signal 172. The output of the logic OR gate 220 generates to the fourth control signal 126.

The illustrated logic circuit 200 presents an exemplary implementation for the driver circuits 108 and 118 using n-channel MOSFET power transistors. Modifications to the logic circuit well within the capabilities of those skilled in the art will need to be made if the high side driver transistors are implemented as p-channel MOSFETs. It will further be understood that other circuit implementations for the logic circuit 200 may be designed by those skilled in the art to achieve same operational control over the driver circuits 108 and 118.

Figure 5A:
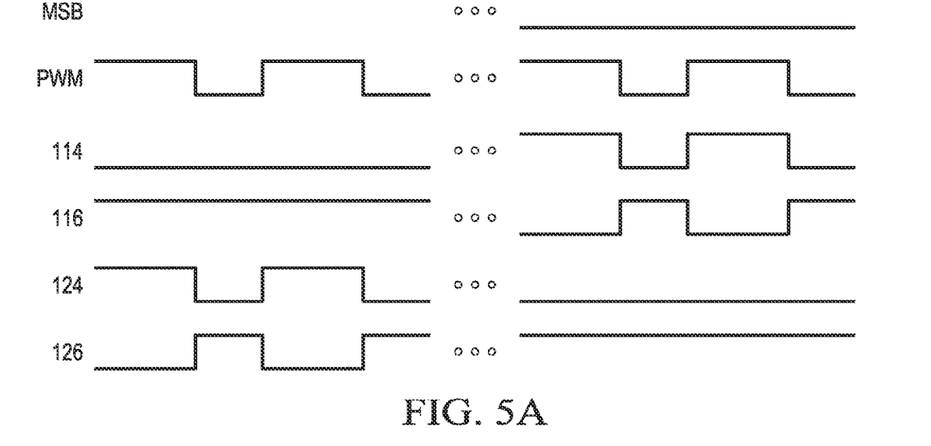
FIG. 5A is a timing diagram for the operation of the logic circuit of FIG. 4.

Reference is now made to FIG. 5A which illustrates a timing diagram for the operation of the logic circuit 200 of FIG. 4.

With respect to the first control signal 114 applied to the gate of the high side drive transistor 110 in the first driver circuit 108 (see, FIG. 2): a) when the MSB is logic high, the signal 114 is logic low (turning off the transistor 110); and b) when the MSB is logic low, the signal 114 is the PWM control signal and the transistor 110 is turned on and off in accordance with the PWM control signal.

With respect to the second control signal 116 applied to the gate of the low side drive transistor 112 in the first driver circuit 108 (see, FIG. 2): a) when the MSB is logic high, signal 116 is logic high (turning on the transistor 112); and b) when the MSB is logic low, the signal 116 is the inversion of the PWM control signal and transistor 112 is turned on and off in accordance with the inverted PWM control signal.

With respect to the third control signal 124 applied to the gate of the high side drive transistor 120 in the second driver circuit 118 (see, FIG. 2): a) when the MSB is logic high, the signal 124 is the PWM drive signal and the transistor 120 is turned on and off in accordance with the PWM control signal; and b) when the MSB is logic low, the signal 124 is logic low (turning off the transistor 120).

With respect to the fourth control signal 126 applied to the gate of the low side drive transistor 122 in the second driver circuit 118 (see, FIG. 2): when the MSB is logic high, the signal 126 is the inversion of the PWM control signal and transistor 122 is turned on and off in accordance with the inverted PWM control signal; and (b) when the MSB is logic low, the signal 126 is logic high (turning on the transistor 122).

Figure 5B:
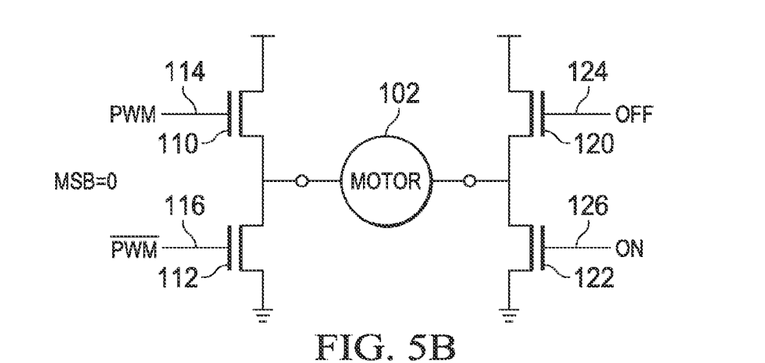
FIGS. 5B and 5C illustrate operation of the motor drive circuitry.

FIG. 5B illustrates the operation of the motor 102 drive circuitry 108 and 118 when the MSB is logic low. In this configuration, the low side drive transistor 122 is turned ON shorting the negative terminal 106 of the motor 102 to ground (GND). The positive terminal 104 of the motor 102 is driven in PWM mode with the high side drive transistor 114 driven by the PWM control signal and the low side drive transistor 116 driven by the inverted PWM control signal.

Figure 5C:
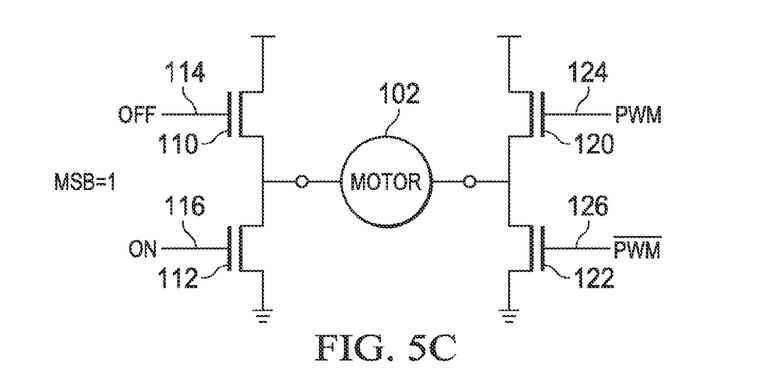

FIG. 5C illustrates the operation of the motor 102 drive circuitry 108 and 118 when the MSB is logic high. In this configuration, the low side drive transistor 112 is turned ON shorting the positive terminal 104 of the motor 102 to ground (GND). The negative terminal 106 of the motor 102 is driven in PWM mode with the high side drive transistor 124 driven by the PWM control signal and the low side drive transistor 126 driven by the inverted PWM control signal.

The selective shorting of the positive terminal 104 or negative terminal 106 of the motor 102 to ground (GND) in dependence on the logic state of the MSB provides an important advantage when operating the motor 102 (such as when performing a VCM arm retract operation). By shorting the motor terminal opposite the PWM signal application to ground through the low side drive transistor, along with turning off the associated high side switching transistor, there is a significant saving of energy because only one side of the motor is switching. Considering this energy saving and the intrinsic higher efficiency of a switching mode driver (in comparison to prior art linear drivers), energy consumption during VCM arm retract is accordingly reduced, and the amount of time available to complete the retract operation is extended.

To summarize, consider the scenario where the motor 102 is a voice coil motor (VCM) of a hard disk drive (HDD) system. The HDD system includes a disk on which data is stored, a spindle motor which rotates the disk and a read/write head attached to a VCM arm that is actuated by the VCM. When a power loss (any power supply inactivation such as a power failure event or a power-down event) occurs, the voltage at the VPWR supply node will fall (it being understood that the voltage at the VPWR supply node is supported by harvesting energy from the spindle motor and/or storage capacitor, as known in the art). Before power at the VPWR supply node is completely lost, it is important to move the read/write head to the safety zone away from the disk. This is referred to in the art as "ramp unloading" or "parking" the VCM arm. If the VCM arm is not fully parked in the safety zone, the read/write head may land on the disk while the disk is spinning or stopped potentially resulting in damage to the disk and/or the head. It is thus critical to ensure full retraction of VCM arm.

The circuit 100 of FIG. 2 controls operation of the motor 102 in an emergency retraction operation to move the VCM arm to park. The circuit 100 further regulates the speed of motor 102 operation during retract so as to ensure a safe parking of the VCM arm.

The motor is driven in discontinuous mode. During a sensing phase of operation, the drive circuitry 108 and 118 is tri-stated and the amplifier 130 measures the $B_{EMF}$ of the motor 102 (that measurement being indicative of the speed of motor rotation). The measured BEMF is sampled and converted to a digital value for comparison to a target BEMF value (the target being indicative of a target speed of motor rotation). The comparison is made by a summation circuit 160 and the resulting error signal is processed through a proportional-integral controller circuit 170 to produce a digital control signal.

During a subsequent driving phase of operation (following the sensing phase of operation mentioned above), the magnitude portion of the digital control signal is compared against a variable slope ramp signal to generate a PWM control signal. The supply voltage VPWR for the motor drive circuitry is further sampled and converted to a digital value which controls the setting of the variable slope for the ramp signal. The duty cycle of the PWM signal is accordingly determined as a function not only of the error signal but also the current supply voltage VPWR. The sign portion of the digital control signal and the generated PWM signal are used to control operation of the motor drive circuitry 108 and 118. The drive circuitry is implemented in an H-bridge configuration. The sign bit is used to control the direction of current application through the motor and further to control a selective shorting of one motor terminal to ground while the other motor terminal is driven in PWM mode in response to the PWM signal.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A circuit for driving a motor having a positive terminal and negative terminal, comprising:
    a drive circuit configured to be coupled to the positive and negative terminals of the motor and operable to drive motor operation;
    a back EMF ($B_{EMF}$) sensing circuit configured to be coupled to the positive and negative terminals of the motor and operable to sense motor $B_{EMF}$;
    an error circuit operable to compare the sensed motor $B_{EMF}$ to a target $B_{EMF}$ and generate a motor control signal in response to said comparison;

a power supply sensing circuit configured to sense a supply voltage of the drive circuit; and a pulse width modulation (PWM) circuit configured to generate a PWM control signal in response to a comparison of the motor control signal to a ramp signal having a variable slope, wherein the variable slope is selected in response to the sensed supply voltage;

wherein operation of said drive circuit is controlled in response to said PWM control signal.

2. The circuit of claim 1, wherein the motor is a voice coil motor (VCM) of a hard disk drive (HDD) system.

3. The circuit of claim 1, further comprising: an analog-to-digital converter (ADC) having an input coupled to an output of the back EMF ($B_{EMF}$) sensing circuit and an output coupled to the error circuit.

4. The circuit of claim 1, further comprising: an analog-to-digital converter (ADC) operable to convert the sensed supply voltage for application to the PWM circuit.

5. The circuit of claim 1, further comprising:
a multiplexing circuit having a first input coupled to the supply voltage and a second input coupled to an output of the back EMF ($B_{EMF}$) sensing circuit;
an analog-to-digital converter (ADC) having an input coupled to an output of the multiplexing circuit, the ADC configured to generate a digital value of the sensed back EMF ($B_{EMF}$) and further configured to generate a digital value of the sensed supply voltage.

6. The circuit of claim 5, wherein the digital value of the sensed back EMF ($B_{EMF}$) is generated from a first output of the ADC and the digital value of the sensed supply voltage is generated from a second output of the ADC.

7. The circuit of claim 1, wherein the error circuit comprises a summation circuit configured to compare the sensed motor $B_{EMF}$ to the target $B_{EMF}$.

8. The circuit of claim 7, wherein the error circuit further comprises a proportional-integral controller circuit coupled to the output of the summation circuit and configured to generate the motor control signal in response to said comparison.

9. The circuit of claim 1, wherein the motor control signal is a digital data signal having a sign bit and a plurality of magnitude bits, and wherein said drive circuit includes a transistor responsive to said sign bit to selectively short one of the positive and negative terminals of the motor to a reference voltage supply node while the other one of the positive and negative terminals of the motor is driven in response to said PWM control signal.

10. The circuit of claim 9, wherein the plurality of magnitude bits set a threshold value for a PWM comparison to the variable slope ramp signal.

11. The circuit of claim 1, wherein the variable slope is linearly proportional to the sensed supply voltage.

12. A method for driving a motor, comprising:
sensing a back EMF ($B_{EMF}$) of the motor;
comparing the sensed motor $B_{EMF}$ to a target $B_{EMF}$;
generating a motor control signal in response to said comparison;
sensing a circuit supply voltage;
generating a PWM control signal in response to a comparison of the motor control signal to a ramp signal having a variable slope, wherein the variable slope is selected in response to the sensed circuit supply voltage; and
controlling operation of the motor in response to said PWM control signal.

13. The method of claim 12, wherein the motor is a voice coil motor (VCM) of a hard disk drive (HDD) system.

14. The method of claim 12, further comprising: converting the sensed motor back EMF ($B_{EMF}$) to a digital value.

15. The method of claim 12, further comprising: converting the sensed supply voltage to a digital value.

16. The method of claim 12, further comprising:
selecting between the sensed motor back EMF ($B_{EMF}$) and the sensed supply voltage; and
converting the selected one of the the sensed motor back EMF ($B_{EMF}$) and the sensed supply voltage to a digital value.

17. The method of claim 12, wherein comparing the sensed motor $B_{EMF}$ to a target $B_{EMF}$ comprises detecting a difference between the sensed motor $B_{EMF}$ and target $B_{EMF}$.

18. The method of claim 17, further comprising performing a proportional-integral control process on said detected difference to generate the motor control signal.

19. The method of claim 12, wherein the motor control signal is a digital data signal having a sign bit and a plurality of magnitude bits, and further comprising operating in response to said sign bit to selectively short one of a positive and negative terminals of the motor to a reference voltage supply node while the other one of the positive and negative terminals of the motor is driven in response to said PWM control signal.

20. The method of claim 19, wherein generating the PWM control signal comprises comparing the variable slope ramp signal to a threshold set by the plurality of magnitude bits.

21. The method of claim 12, wherein the variable slope is linearly proportional to the sensed supply voltage.

22. An apparatus, comprising:
a motor having a positive terminal and negative terminal;
a drive circuit coupled to the positive and negative terminals of the motor; and
a control circuit coupled to the motor and the drive circuit and operable to:
sense a back EMF ($B_{EMF}$) of the motor;
compare the sensed motor $B_{EMF}$ to a target $B_{EMF}$ and generate a motor control signal;
sense a supply voltage of the drive circuit;
generate a PWM control signal by comparing the motor control signal to a ramp signal having a variable slope selected in response to the sensed supply voltage; and
control operation of the drive circuit in response to said PWM control signal.

* * * * *